US005480070A

United States Patent [19]

Wallner et al.

[11] Patent Number: 5,480,070
[45] Date of Patent: Jan. 2, 1996

[54] CONVEYING ARRANGEMENT FOR THE DOSED CONVEYANCE OF BULK MATERIAL

[75] Inventors: Felix Wallner, Linz; Leopold W. Kepplinger, Leonding; Christian Bohm, Wels, all of Austria

[73] Assignee: Deutsche Voest-Alpine Industrieanlagenbau GmbH, Dusseldorf, Germany

[21] Appl. No.: 88,313

[22] Filed: Jul. 7, 1993

[30] Foreign Application Priority Data

Jul. 7, 1992 [AT] Austria ........ 1388/92

[51] Int. Cl.$^6$ ........ G01F 11/20

[52] U.S. Cl. ........ 222/413; 198/550.1

[58] Field of Search ........ 222/413; 366/88, 366/90; 414/147; 198/550.1, 676; 425/208, 209

[56] References Cited

U.S. PATENT DOCUMENTS

| | | | |
|---|---|---|---|
| 2,507,245 | 5/1950 | Dady | 198/550.1 |
| 3,184,112 | 5/1965 | Loeser | 222/413 |
| 3,303,917 | 2/1967 | Wilkes et al. | 198/550.1 |
| 3,823,920 | 10/1972 | Mills et al. | 366/138 |
| 3,891,192 | 6/1975 | Bontempi et al. | 366/90 |
| 4,304,054 | 12/1981 | Mauck | 366/90 |
| 4,448,402 | 5/1984 | Weber et al. | 414/197 |
| 5,304,054 | 4/1994 | Meyer | 366/90 |

FOREIGN PATENT DOCUMENTS

| | | |
|---|---|---|
| 0085290 | 8/1983 | European Pat. Off. . |
| 0048008 | 8/1984 | European Pat. Off. . |
| 411175 | 3/1925 | Germany . |
| 1238941 | 2/1967 | Germany . |
| 8024491 | 9/1983 | Germany . |

*Primary Examiner*—Andres Kashnikow
*Assistant Examiner*—Philippe Derakshani
*Attorney, Agent, or Firm*—Ostrolenk, Faber, Gerb & Soffen

[57] ABSTRACT

A conveying arrangement for the dosed conveyance of bulk material from one metallurgical vessel into another through a conveying channel. The conveying channel has an entry opening and a discharge opening. A conveyor worm is rotatably located in the conveying channel, extending at least from the entry opening to the discharge opening and including a first flight formed by a plurality of paddles. In order to be able to configure the conveyor worm as short as possible and to minimize gas streaming through the conveying channel, the conveyor worm, on its end associated with the discharge opening, has a second flight that is formed by a continuous helix extending at least over half a convolution.

20 Claims, 2 Drawing Sheets

CONVEYING ARRANGEMENT FOR THE DOSED CONVEYANCE OF BULK MATERIAL

BACKGROUND OF THE INVENTION

1. Field of the Invention

The invention relates to a conveying arrangement for the dosed conveyance of bulk material, in particular an arrangement for conveying ore, coal, etc., from one metallurgical vessel into another, comprising a conveying channel including an entry opening and a discharge opening, and a conveyor worm provided in the conveying channel, extending at least from the entry opening of the conveying channel to the discharge opening and provided with a first flight formed by paddles and a second flight formed by a continuous helix.

DESCRIPTION OF THE RELATED ART

A paddle worm conveyor is known from EP-B-0 048 008. The conveying means described there serves to convey hot sponge iron particles from a direct reduction shaft furnace into a melter gasifier. The flight of the known conveying means in its entirety is formed by consecutively arranged individual paddles, wherein a free space is provided between neighboring paddles, through which the bulk material can pass.

Worms of this type, so called "paddle worms", have proved successful in that the bulk material is torn up again and again by the paddles such that it cannot agglomerate within the conveying channel, which, when using a one-part conveyor worm, i.e., a continuous helix, by the material may lead to the formation of a kind of tube within the conveying channel, whereby the material to be conveyed gets stuck around the worm, the worm, thus, running idle. Another essential advantage of a paddle worm is in manufacture which is substantially simpler and less expensive, in particular with large conveyor worm diameters of, e.g., 1 m, than of a worm comprising a flight formed by a continuous helix.

However, paddle worms also have disadvantages for instance, it is necessary to extend the conveying channel over a given length, which is expensive, and complex in construction, in particular with cantilever-mounted conveyor worms, since a short conveying channel may cause the bulk material to flow out of the discharge opening of the conveying channel in an uncontrolled manner, because the bulk material, as mentioned above, automatically passes through the free space provided between the paddles, according to its bulk angle. In order to prevent jamming of the bulk material between the periphery of the paddles and the internal lining of the conveying channel; which is filled almost completely with bulk material, and to provide for sufficient passing space of the bulk material particles, it is necessary to provide a relatively large gap between the outer periphery of the paddles and is the internal lining of the conveying channel. As a rule, this annula gap is substantially larger than the maximum grain diameter of the bulk material to be conveyed. Hence follows a high gas permeability.

If one is forced for structural reasons to configure the conveying channel particularly short, it will be necessary when using a paddle worm to equip the discharge opening with a separate blocking means to prevent the bulk material from automatically flowing out with the conveyor worm after operation ceases.

SUMMARY OF THE INVENTION

The present invention aims at avoiding these disadvantages and difficulties by providing a conveying arrangement of the initially defined type, which basically involves the same expenditures in terms of manufacture as a paddle worm and with which the above-mentioned tube formation within the conveying channel and the idle rotation of the worm are reliably prevented. Advantageously, however, with the present invention particularly short conveying channel and, thus, a very short conveyor worm can be used, without requiring a separate blocking means provided at the discharge opening. Furthermore, the conveying arrangement according to the present invention has an elevated flow resistance against gas streaming through the conveying channel.

In accordance with the invention, this object is achieved in that the conveyor worm, on its end associated with the discharge opening of the conveying channel, has a flight that is formed by a continuous helix extending at least over half a convolution, the helix being downstream of the flight formed by the paddles.

According to a preferred embodiment, a particularly high flow resistance against gas streaming through the channel is achieved because the flight formed by the continuous helix has a larger external diameter than the flight formed by the paddles and is provided in the extension thereof. Furthermore, the risk of bulk material getting jammed in the gap between the outer periphery of the conveyor worm and the internal wall of the conveying channel is avoided, because, the flight in that part which is formed by a continuous helix is no longer completely filled with bulk material, since the continuous helix does not exhibit any intermediate spaces which the bulk material would flow..

According to another preferred embodiment of the present invention the width of the annular gap provided between the outer periphery of the continuous helix and the internal wall of the conveying channel approximates the maximum grain diameter of the bulk material to be conveyed.

A very short conveying channel will do, if the continuous helix extends over the total length f the conveying channel, from the entry opening to the discharge opening of the same. This preferred embodiment also guarantees a great resistance against gas streaming through, thus reliably preventing the bulk material from automatically flowing toward the discharge opening when the conveyor worm is not in operation, in any position of the same.

Preferably, the continuous helix extends over at least three quarters of a convolution, more preferably over one and a half to two convolutions.

If bulk material is to be conveyed which may cause great wear by grains getting jammed, the flight formed by the paddles advantageously extends as far as possible into the interior of the conveying channel, preferably by half a convolution to one and a quarter convultions. The paddles with the intermediate spaces, provided within the conveying channel enable the grains of the bulk material to avoid the vicinity of the entry opening where the flight is completely filled with intowing bulk material, such that the grains are prevented from getting jammed between the outer periphery of the conveyor worm and the internal wall of the conveying channel.

According to the present invention it is possible to have a particularly short conveying channel, the length of the conveying channel from the entry opening to the discharge opening preferably being equal to, or larger than, a) the length of the continuous helix along axis of rotation of the the conveyor worm plus b) the projected length of the straight line laid a the bulk angle of the bulk material between the beginning of the continuous helix located close to three entry opening, along the axis of rotation of the conveyor worm, and the intersection with the uppermost point of the conveying channel.

The invention will be explained in more detail by way of several embodiments illustrated in the drawings, following:

DESCRIPTION OF THE PREFERRED EMBODIMENTS

Figure 1:
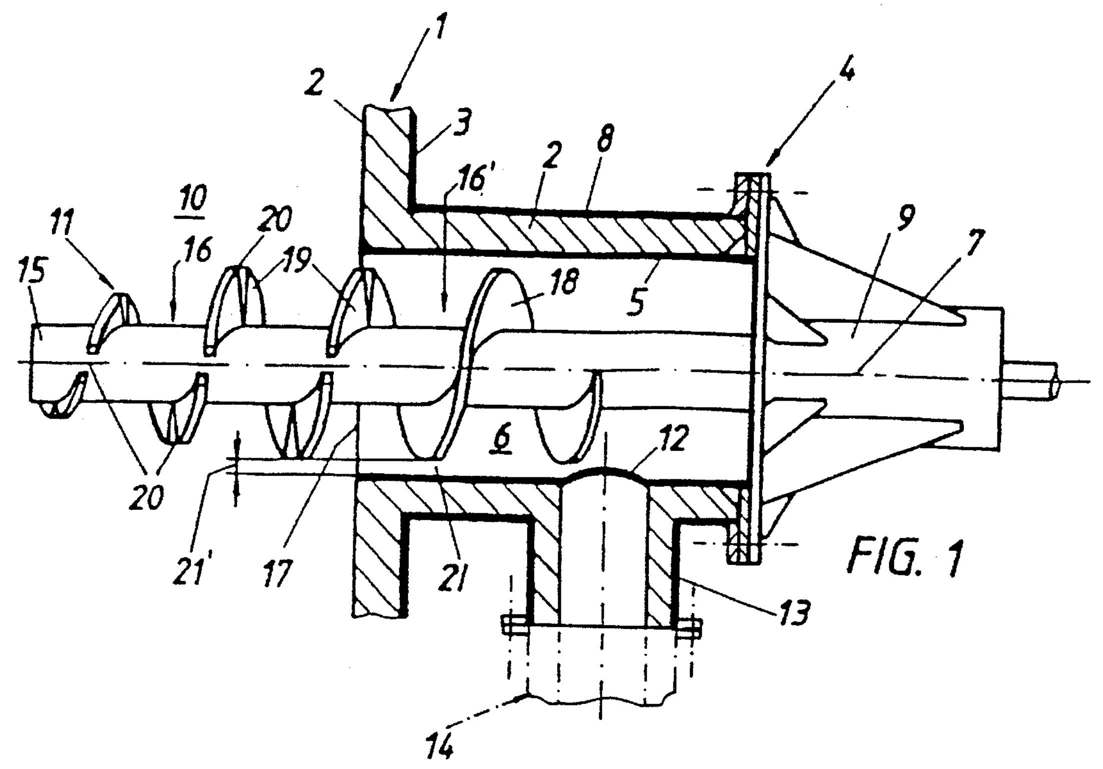
FIGS. 1 to 4 each illustrate an axial longitudinal cross-section through a conveying arrangement according to each of four embodiments of the present invention.

Referring to FIGS. 1–4, the conveying arrangement of the present invention includes an approximately vertical side wall 1 of a direct reduction shaft furnace, which is formed by a refractory lining 2 and a steel shell 3 surrounding the same, a conveying means 4 is arranged at a fight angle relative to this side wall 1. The conveying means 4 includes a conveying channel 6 having a circular cross section and armored with a steel internal lining 5 (or a lining of brickwork), and whose central axis 7 extends approximately at a right angle relative to the side wall 1. The internal lining 5 is surrounded by refractory lining 2, which in turn is enclosed by a steel shell 8.

To the outer free end of the conveying channel 6, there are ranged a bearing means 9 and a driving means (not illustrated) for a cantilever-mounted conveyor worm 11 extending through the conveying channel 6 into the interior 10 of the direct reduction shaft furnace. In the bottom of the conveying channel 6, a discharge opening 12 for the bulk material to be conveyed is provided, which is surrounded by a vertically downwardly oriented socket 13 to which a downpipe 14 is ranged.

The conveyor worm 11, by its worm shaft 15, extends in the direction towards the center of the direct reduction shut furnace and includes flights 16, 16'. Flight 16 is designed to taper from the entry opening 17, i.e., the mouth of the conveying channel 6 opening into the interior 10 of the direct reduction shaft furnace, towards the free end 15 of the worm 11 in order to ensure discharge of the bulk material uniformly over the cross sectional area of the direct reduction shaft furnace.

According to the invention, flights 16, 16' of the conveyor worm are designed to vary over the length of the conveyor worm 11, the flight 16' on the end of the conveyor worm 11 associated with the discharge opening 12 of the conveying channel 6 is formed by a continuous helix 18. Helix 18k is formed by a one-piece steel plate shaped to a helical surface that extends to the entry opening 17 by 13/4 convolutions. Upstream of helix 18, the flight 16 is formed by paddles 19 consecutively arranged as helical surfaces, with neighboring paddles enclosing an intermediate space 20. A paddle 19 extends approximately over a quarter of a convulution. However, the paddle could also have a smaller peripheral dimension, for instance, extending over only a sixth of a convolution.

The surfaces paddles 19 are not located on the ideal helical surface, but deviate slightly therefrom, thus breaking up the bulk material present in the interior 10 of the direct reduction shaft furnace and preventing the bulk material from agglomerating at the paddles 19 or getting stuck within the flight 16.

As is apparent from FIG. 1, the bulk material enters the flight 16' formed by the continuous helix 18 at the entry opening 17 such that the flight 16' is filled completely only at its beginning, i.e., in the immediate vicinity of the entry opening 17. The continuous helix 18, when the conveyor worm 11 when not in operation, prevents the bulk material from flowing through from the entry opening 17 to the discharge opening 12. The continuous helix 18 forms an annular gap 21 at its outer periphery relative to the internal wall, i.e., to the internal lining 5 of the conveying channel 6. The width 21' of the annular gap 21 approximately corresponds to the largest grain size of the bulk material to be conveyed. By this relatively narrow annular gap 21, a relatively large resistance against gas streaming there through is created.

Figure 2:
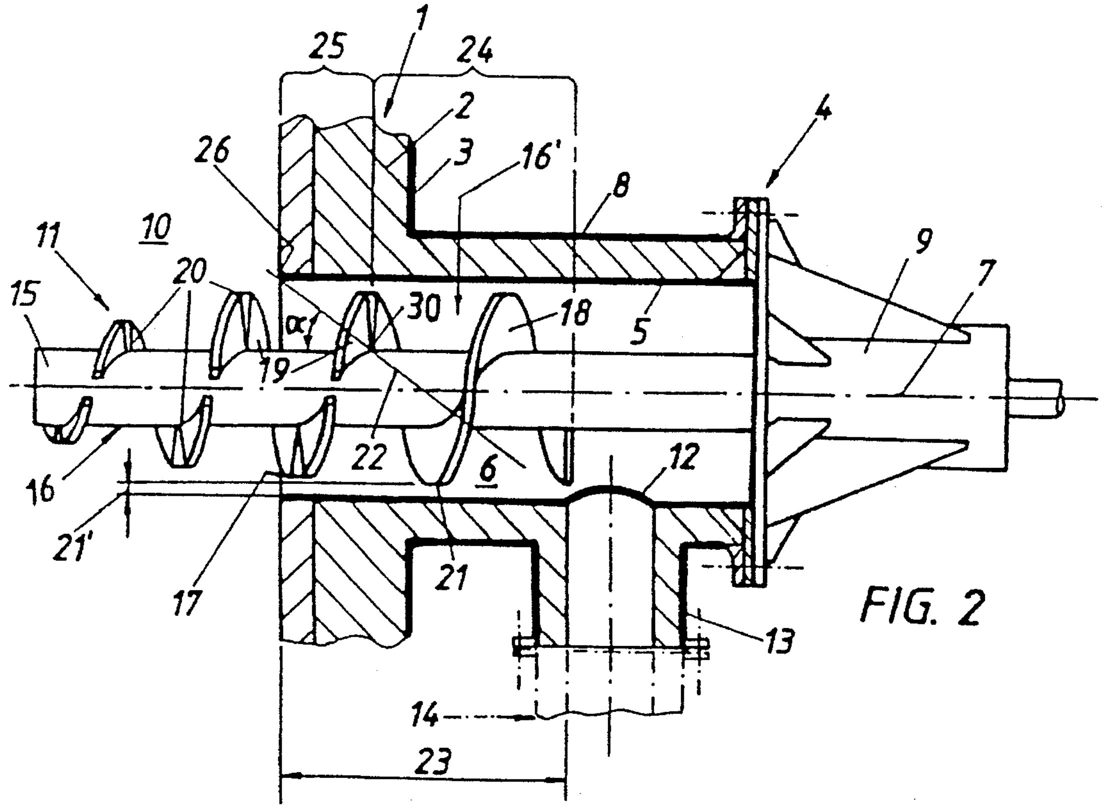

According to the embodiment of FIG. 2, the continuous helix 18 does not extend completely to the entry opening 17, but terminates in front of the same after 1 ½ convolutions, such that the flight 16 formed by the paddles 19 reaches into the interior of the conveying channel 6 by an approximately ¾ of a convolution. In this embodiment, the flight 16', is no longer filed completely due to a conical pile forming, which is represented schematically in FIGS. 2–4, extending inward from entry opening 17 and having a profile bounded by the diagonal straight line 22 having a the bulk angle α.

Due to this configuration, the danger of bulk material getting jammed between the outer periphery of the conveyor worm 11 and the internal lining 5 of the conveying channel 6 and, thus, the wear of the conveyor worm 11 are substantially reduced, since the flight is completely filled merely near the entry opening 17 and evasion of the grains is possible through the intermediate spaces 20 provided between the paddles 19. The extended diameter of the flight 16 formed by the paddles 19 is dimensioned to be less than the external diameter of the flight 16' formed by the continuous helix, the wear of the paddles 19, thus, also being reduced.

Conveying channel 6 includes an uppermost point 26 at the entry opening. As is apparent from FIG. 2, the conveying channel 6 has a length 23 between the entry opening 17 and the discharge opening 12, which corresponds to the sum of the length 24 of the continuous helix 18 along axis of rotation 7 plus the projected length 25 of the straight line 22 extending at the bulk angle α of the bulk material along the axis of rotation from the uppermost point 26 of the entry opening 17 of the conveying channel 6 to the beginning 30 of the helix 18 located close to the entry opening. This Length 23 constitutes the minimum length that is suitable for the perfect functioning of the conveying means. This length also may be exceeded, which, however, should be prevented for reasons of costs.

Figure 3:
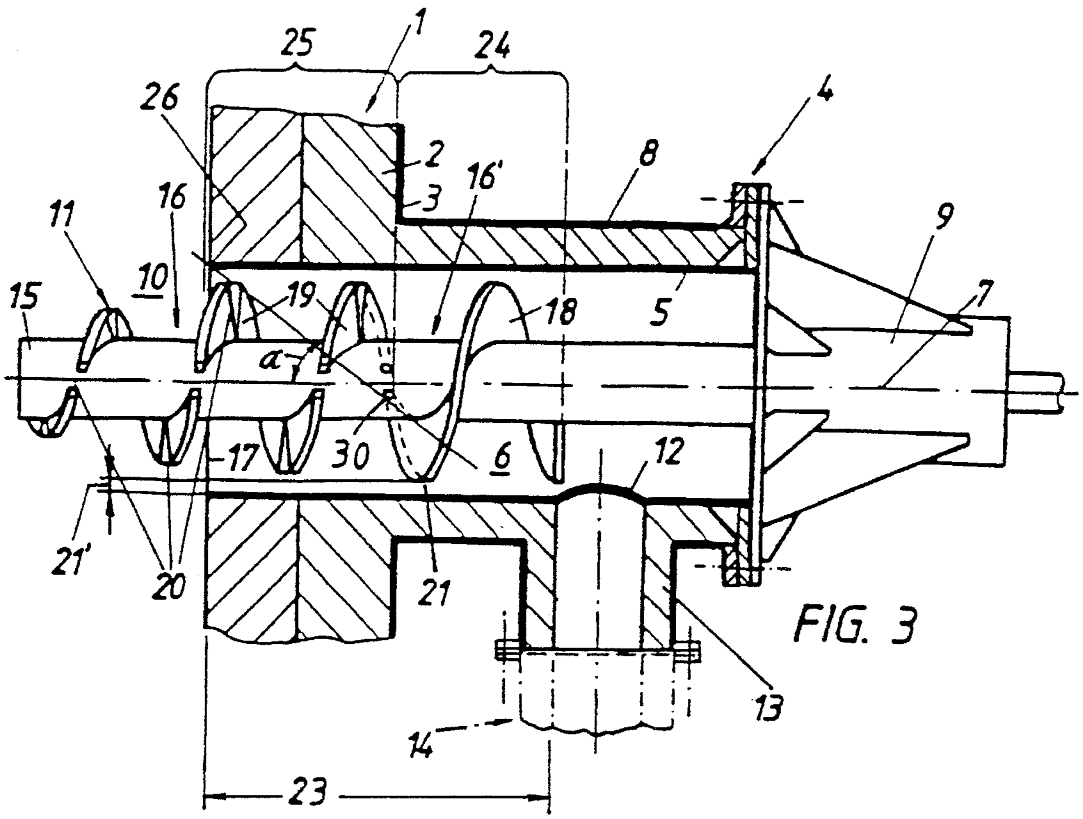

According to the embodiment illustrated in FIG. 3, the continuous helix 18 is dimensioned to be shorter than with the embodiment represented in FIG. 2, which has the advantage of simpler manufacture. This is of importance with larger dimensioned conveyor worms (e.g., worms with a shaft diameter of about 0.5 m, conveying channel diameter of 1 m, conveyor worm length of about 8 m, and thickness of the steel plate forming the continuous helix of about 4 cm).

Figure 4:
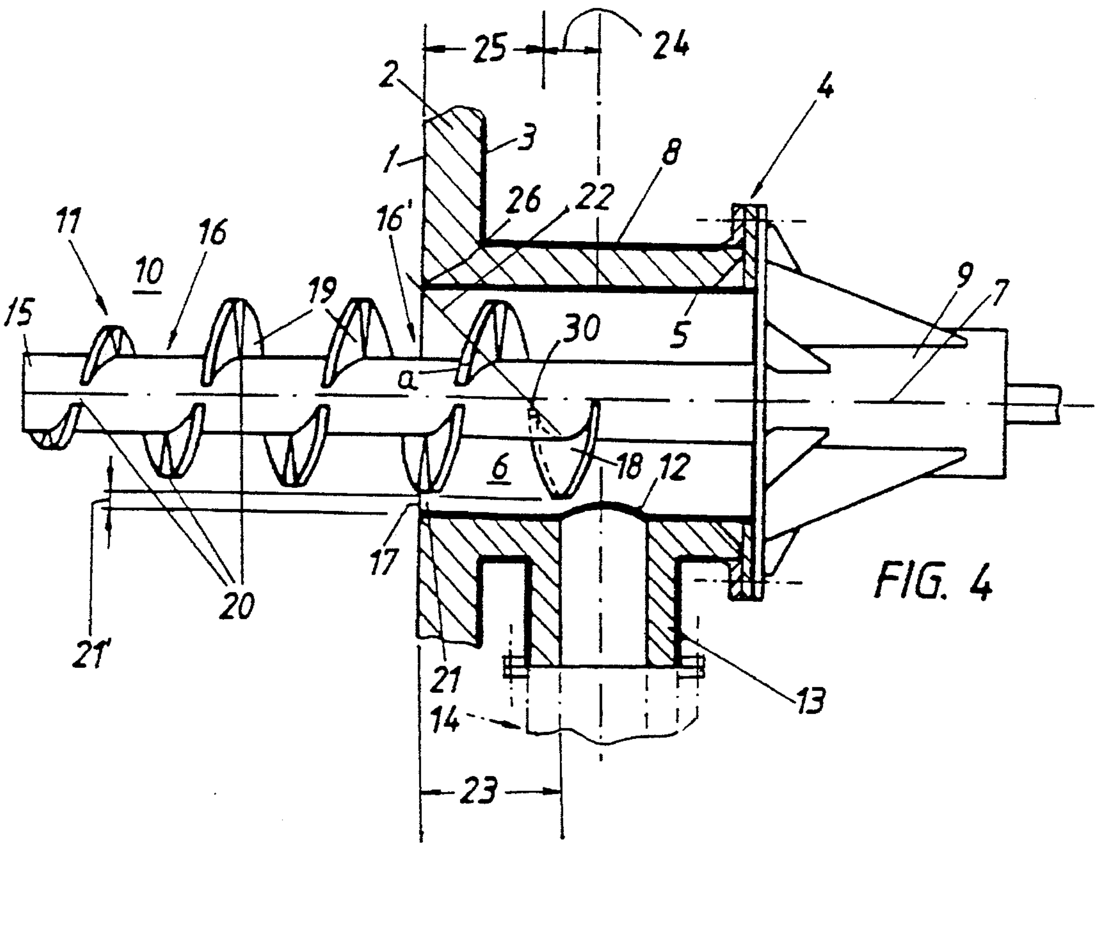

FIG. 4 depicts a further embodiment, in which the continuous helix 18 only extends over half a convolution. With this variant, the bulk material is prevented from automatically flowing from the entry opening 17 to the discharge opening 12 only if the helix 18 is in the position illustrated in FIG. 4, i.e., in its lowermost downward position. If rotation out of this position occurs, the bulk material will automatically flow from the entry opening 17 to the down-pipe 14 without the conveyor worm 11 having to rotate itself, because the conical pile forming at the entry opening 17, the forward profile of the conical pile being represented schematically by the straight line 22, extends beyond the discharge opening 12. In this embodiment, the helix 18 functions as a blocking organ.

What we claim is:

1. A conveying arrangement for dosed conveyance of bulk material from a vessel, the conveying arrangement comprising:

a conveying channel having an entry opening and a discharge opening; and a conveyor worm, rotatably disposed and extending within said conveying channel from at least said entry opening to said discharge opening, said conveyor worm including:.

a first flight means formed by a plurality of paddles and being arranged for extending into an interior of the vessel for conveying the bulk material from the lesser into said conveying channel; and a second flight means downstream of said first flight means for preventing the bulk material from flowing through said discharge opening when said conveyor worm is not rotating, and said second flight means being formed by a continuous helix extending along said conveyor worm by at least one half of a convolution and at most two convolutions wherein said first flight means formed by said plurality of paddles has a first external diameter and said second flight means formed by said continuous helix has a second external diameter, said second external diameter being larger than said first external diameter.

2. A conveying arrangement as set forth in claim 1, wherein said continuous helix has an outer periphery and said conveying channel has a conveying channel internal wall both defining an annular gap therebetween, said annular gap having a width approximately corresponding to the maximum grain diameter of said bulk. material to be conveyed.

3. A conveying arrangement as set forth in claim 1, wherein said continuous helix extends over the total length of said conveying channel from said entry opening to said discharge opening.

4. A conveying arrangement as set forth in claim 3, wherein said continuous helix extends over at least three quarters of a convolution.

5. A conveying arrangement as set forth in clam 4, wherein said continuous helix extends over at least one and a half to two convolutions.

6. A conveying arrangement as set forth in claim 1, wherein said first flight means formed by said paddles extends within said conveying channel.

7. A conveying arrangement as set forth in claim 6, wherein said first flight means extends within said conveying channel interior by at least one half a convolution to one and a quarter convolutions.

8. A conveying arrangement for dosed conveyance of bulk material, comprising:

a conveying channel having an entry opening and a discharge opening; and a conveyor worm, rotatably disposed and extending within said conveying channel from at least said entry opening to said discharge opening said conveyor worm including a first flight means for conveying the bulk material and a second flight means downstream of said first flight means for preventing the bulk material from flowing from the channel when the conveyor worm is not rotating, said first flight means being formed by a plurality of paddles and said second flight means being formed by a continuous helix extending along said conveyor worm by at least one half of a convolution;

wherein first flight means formed by said plurality of paddles extends within said conveying channel by at least one half a convolution to one and a quarter convolutions; and wherein bulk material collects in a conical pile within said conveying channel, the conical pile extending within said conveying channel from said entry opening to a beginning of said continuous helix located near said discharge opening.

9. A conveying arrangement as set forth in claim 8, wherein said conveying channel has an uppermost point at said entry opening, and a length which extends from said entry opening to said discharge opening.

10. A conveying arrangement as set forth in claim 9, wherein the conical pile of bulk material has a bulk angle defined by a straight line extending between the uppermost point of said conveying channel and the beginning of said continuous helix.

11. A conveying arrangement as set forth in claim 10, wherein said conveyor worm has an axis of rotation, and said conveying channel length equals a sum of a length of said continuous helix along said conveying worm axis of rotation, plus a projected length of the straight line laid at the bulk angle of said bulk material along said conveyor worm axis of rotation between the uppermost point of said conveying channel and the beginning of said continuous helix.

12. A conveying arrangement as set forth in claim 10, wherein said conveyor worm has an axis of rotation, and said conveying channel length is larger than a sum of a length of said continuous helix along said conveying worm axis of rotation, plus a projected length of the straight line laid at the bulk angle of said bulk material, along said conveyor worm axis of rotation, between the uppermost point of said conveying channel and the beginning of said continuous helix.

13. A conveying arrangement as set forth in claim 10, wherein the length of said conveying channel is shorter than a sum of a length of said continuous helix along said conveying worm axis of rotation, plus a projected length of the straight line laid at the bulk angle of the bulk material along said conveyor worm axis of rotation between the uppermost point of said entry opening and the beginning of said continuous helix, when said continuous helix is in a lowermost downward position in said conveying channel upon termination of rotation of said conveying worm.

14. A conveying arrangement as set forth in claim 10, wherein said conveying channel length is equal to a base of the conical pile of bulk material extending within the conveying channel.

15. A conveying arrangement as set forth in claim 10, wherein said conveying channel length is larger than a base of the conical pile of bulk material extending within the conveying channel.

16. A conveying arrangement as set forth in claim 10 wherein the length of said conveying channel is shorter than a base of the conical pile of bulk material extending within the conveying channel.

17. A conveying arrangement for the dosed conveyance of bulk material from a first metallurgical vessel to a second metallurgical vessel, comprising:

a conveying channel including an upstream entry opening, a downstream discharge opening surrounded by a downwardly directed socket leading to the second metallurgical vessel, and an outer end; and a conveyor worm provided in the conveying channel, the conveyor worm extending at least from the entry opening of the conveying channel to the discharge opening and provided with:

a first flight formed by paddles and being arranged for extending into the interior of the first metallurgical vessel; and a second flight formed by a continuous helix and arranged downstream of the flight formed by the paddles, the continuous helix extending over at least half a convolution and at most two convolutions, the end of the continuous helix being arranged in the region of the discharge opening for preventing the bulk material to be conveyed from flowing to the discharge opening.

18. A conveying arrangement as set forth in claim 18, wherein said first flight means formed by said paddles has a first external diameter and said second flight means formed by said continuous helix has a second external diameter, said second external diameter being larger than said first external diameter.

19. A conveying arrangement as set forth in claim 18, wherein said continuous helix has an outer periphery and said conveying channel has a conveying channel internal wall both defining an angular gap therebetween, said annular gap having a width approximately corresponding to the maximum grain diameter of said bulk material to be conveyed.

20. A conveying arrangement as set forth in claim 18, wherein said continuous helix extends over the total length of said conveying channel from said entry opening to said discharge opening.

* * * * *

UNITED STATES PATENT AND TRADEMARK OFFICE

CERTIFICATE OF CORRECTION

PATENT NO. : 5,480,070

DATED : January 2, 1996

INVENTOR(S) : Felix WALLNER et al.

It is certified that error appears in the above-indentified patent and that said Letters Patent is hereby corrected as shown below:

Claim 1, column 5, line 21, change "lesser" to --vessel--.

Claim 18, column 8, line 1, change "claim 18" to --claim 17--.

Claim 19, column 8, line 7, change "claim 18" to --claim 17.

Claim 19, column 8, line 14, change "claim 18" to --claim 17--.

Signed and Sealed this

First Day of April, 1997

Attest:

Bruce Lehman

BRUCE LEHMAN

*Attesting Officer* *Commissioner of Patents and Trademarks*